(12) United States Patent
Kim et al.

(10) Patent No.: US 8,403,573 B2
(45) Date of Patent: Mar. 26, 2013

(54) DIGITAL SINGLE LENS REFLEX (DSLR) CAMERA

(75) Inventors: Dong-min Kim, Changwon (KR); Hong-ju Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 12/362,519

(22) Filed: Jan. 30, 2009

(65) Prior Publication Data

US 2009/0190913 A1 Jul. 30, 2009

(30) Foreign Application Priority Data

Jan. 30, 2008 (KR) .................. 10-2008-0009678

(51) Int. Cl.
*G03B 19/12* (2006.01)
(52) U.S. Cl. ... 396/354; 396/296; 396/384; 348/333.01; 348/333.02
(58) Field of Classification Search ............... 396/296, 396/354, 384, 439, 447, 373, 374
See application file for complete search history.

(56) References Cited

U.S. PATENT DOCUMENTS

| | | | | | |
|---|---|---|---|---|---|
| 3,760,700 | A | * | 9/1973 | Trankner et al. | 396/295 |
| 3,952,321 | A | * | 4/1976 | Matui | 396/384 |
| 5,170,204 | A | * | 12/1992 | Mukai et al. | 396/147 |
| 5,526,083 | A | * | 6/1996 | Misawa | 396/51 |
| 5,754,900 | A | * | 5/1998 | Suda | 396/296 |
| 6,047,139 | A | | 4/2000 | Suda | |
| 6,125,239 | A | * | 9/2000 | Homma | 396/296 |
| 6,468,676 | B1 | * | 10/2002 | Ueda et al. | 428/690 |
| 6,738,577 | B1 | | 5/2004 | Yokota et al. | |
| 6,980,247 | B1 | * | 12/2005 | Kodama et al. | 348/333.01 |
| 7,061,011 | B2 | * | 6/2006 | Forrest et al. | 257/40 |
| 2003/0132896 | A1 | * | 7/2003 | Matsueda | 345/55 |
| 2006/0001091 | A1 | * | 1/2006 | Kim | 257/347 |
| 2006/0164230 | A1 | * | 7/2006 | DeWind et al. | 340/461 |
| 2007/0002161 | A1 | * | 1/2007 | Yamasaki | 348/345 |
| 2007/0019097 | A1 | * | 1/2007 | Fukui | 348/333.01 |
| 2007/0264525 | A1 | * | 11/2007 | Chiba et al. | 428/690 |
| 2008/0170011 | A1 | * | 7/2008 | Kohno et al. | 345/77 |
| 2008/0170849 | A1 | * | 7/2008 | Kaneko et al. | 396/384 |
| 2008/0198147 | A1 | * | 8/2008 | Hitosuga | 345/184 |

(Continued)

FOREIGN PATENT DOCUMENTS

EP 1 862 846 A1 12/2007
JP 05-107595 A 4/1993

(Continued)

OTHER PUBLICATIONS

Office Action established for CN 200910003906.8.
Examination Report established for GB 0901269.1 (Feb. 6, 2012).
Examination Report established for GB 0901269.1 (Nov. 9, 2011).

(Continued)

*Primary Examiner* — Clayton E Laballe
*Assistant Examiner* — Warren K Fenwick
(74) *Attorney, Agent, or Firm* — Drinker Biddle & Reath LLP

(57) ABSTRACT

A digital single lens reflex (DSLR) camera is provided for displaying predetermined photographing information, including focus information, camera information, etc., on a display screen of a viewfinder. The DSLR camera includes: the viewfinder for observing an image of an object; a pentaprism outputting the image of the object to the viewfinder; and a display device disposed on a side of the pentaprism to display photographing information.

17 Claims, 7 Drawing Sheets

U.S. PATENT DOCUMENTS

2009/0231480 A1* 9/2009 Oyama .................... 348/333.01
2010/0011637 A1* 1/2010 Zhang .............................. 40/442

FOREIGN PATENT DOCUMENTS

| | | |
|---|---|---|
| JP | 2000-137268 A | 5/2000 |
| JP | 2000-221578 A | 8/2000 |
| JP | 2003-209720 A | 7/2003 |
| JP | 2005-345814 A | 12/2005 |
| JP | 2005-345966 A | 12/2005 |
| JP | 2007-033701 A | 2/2007 |

OTHER PUBLICATIONS

Examination Report established for GB 0901269.1 (May 22, 2012).
"Canon EOS 300D/Digital Rebel/Kiss Digital Review: Digital Photography Review," dpreview.com, retrieved from internet website: http://www.dpreview.com/reviews/canoneos300d/4 on May 21, 2012, pp. 1-3 (2003).
"Nikon D80 Review: Digital Photography Review," dpreview.com, retrieved from internet website: http://www.dpreview.com/reviews/nikond80/4 on May 21, 2012, pp. 1-3 (2006).

* cited by examiner

DIGITAL SINGLE LENS REFLEX (DSLR) CAMERA

CROSS-REFERENCE TO RELATED PATENT APPLICATION

This application claims the benefit of Korean Patent Application No. 10-2008-0009678, filed on Jan. 30, 2008, in the Korean Intellectual Property Office, the disclosure of which is incorporated herein in its entirety by reference.

BACKGROUND

1. Field of the Invention

The present invention relates to a digital single lens reflex (DSLR) camera, and more particularly, to a DSLR camera for displaying predetermined photographing information, including focus information, camera information, etc., on a display screen of a viewfinder.

2. Description of the Related Art

Beginners can take photographs like professional photographers due to the popularization of digital single lens reflex (DSLR) cameras, which are single lens reflex cameras that take digital photographs.

Here, a single lens reflex refers to a method of transmitting an image of an object to a viewfinder through a lens or transmitting light to a sensor that takes pictures. Generally used digital cameras are binocular. Therefore, an image seen on a generally used digital camera is different from an image photographed with the generally used digital camera. As a result, a user can capture an image transmitted to a sensor, seeing the image on a screen.

However, a conventional superimposing apparatus is developed for such DSLR cameras to display a focal point on an image of an object, which is observed on a viewfinder. In other words, the conventional superimposing apparatus including a plurality of light-emitting elements is installed on a side of an optical path, and a light-emitting element corresponding to a focal area emits light to form a point mark for finding a range. As a result, the conventional superimposing apparatus displays focus information to a user who observes an image of an object, on a viewfinder.

Such a conventional superimposing apparatus is formed separately from a pentaprism and thus is not easily assembled. Thus, an assembly error may occur between the pentaprism and the conventional superimposing apparatus. In this case, a range finder point measuring error and an imposing distorting phenomenon occur. As a result, a serious problem occurs, i.e., a focal point of an image that is being photographed is defocused. Also, focus information is displayed only in an area in which the light-emitting element is installed.

In addition, a series of pieces of camera information, including a currently set photographing mode, the number of images to be photographed, International Standardization Organization (ISO) sensitivity, a shutter speed, an aperture value, etc., is not able to be checked in the viewfinder of the conventional single lens reflex camera. Accordingly, if a user desires to check the camera information while observing an image of an object, on the viewfinder, the user must distance his or her eyes from the viewfinder to be able to properly check the camera information displayed on a display window and also then be able to check the image of the object, on the viewfinder.

SUMMARY

The present invention provides a digital single lens reflex (DSLR) camera for displaying predetermined photographing information, including focus information, camera information, etc., on a display screen of a viewfinder.

According to an aspect of the present invention, there is provided a DSLR camera including: a viewfinder for observing an image of an object; a pentaprism outputting the image of the object to the viewfinder; and a display device disposed on a side of the pentaprism to display photographing information.

The display device may be an organic light-emitting display device.

The organic light-emitting display device may include: at least one thin film transistor (TFT) including an active layer formed on a substrate, a gate electrode insulated from the active layer, and source and drain electrodes contacting the active layer; and an organic light-emitting diode (OLED) electrically connected to the TFT.

The image of the object may be displayed on the viewfinder, together with the photographing information displayed on the display device.

The photographing information may include focus information of the image of the object.

The focus information may overlap with the image of the object, in an area of the display device that overlaps with a focal area of the image of the object.

The photographing information may include camera information as currently set in the DSLR camera.

The camera information may include at least one of a photographing mode, the number of images to be photographed, International Standardization Organization (ISO) sensitivity, a shutter speed, and an aperture value.

The display device may be attached to a side of the pentaprism.

The side of the pentaprism to which the display device may be attached is one of the sides of the pentaprism that reflects the image of the object.

The display device may substantially have the same size as the side of the pentaprism to which the display device is attached.

According to another aspect of the present invention, there is provided a DSLR camera including: a lens unit; a mirror changing an advancing direction of light of an object, which has passed the lens unit; a focal plate on which an image of the object is formed; and a finder optical system for observing the image of the object formed on the focal plate, wherein the image of the object formed on the focal plate and photographing information of the DSLR camera are simultaneously displayed using the finder optical system.

The finder optical system may include: a viewfinder for observing the image of the object; a pentaprism outputting the image of the object to a viewfinder; and a display device disposed on a side of the pentaprism to display photographing information.

The display device may be an organic light-emitting display device.

The light-emitting display device may include: at least one TFT including a semiconductor active layer formed on a substrate, a gate electrode insulated from the semiconductor active layer, and source and drain electrodes contacting the semiconductor active layer; a plurality of pixel electrodes formed on the TFT; pixel defining layers formed among the pixel electrodes; a plurality of organic layers respectively formed on the pixel defining layers; and a counter electrode formed on the organic layers.

The display device may be formed in a size that is larger than the image of the object, which is formed on the focal plate.

An area of the display device, which optically overlaps with the image of the object, may be displayed in black.

Measured focus information of the image of the object may be displayed on an area of the display device, which optically overlaps with the image of the object.

Camera information may be displayed in an area of the display device, wherein the area of the display device is outside the area of the display device, which optically overlaps with the image of the object.

The camera information may include at least one of a photographing mode, the number of images to be photographed, ISO sensitivity, a shutter speed, and an aperture value.

The pentaprism and the display device may be formed into a single body.

According to another aspect of the present invention, there is provided a DSLR camera overlapping, on a viewfinder, an image of an object, with photographing information of the DSLR camera.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described in detail with reference to the attached drawings.

Figure 1:
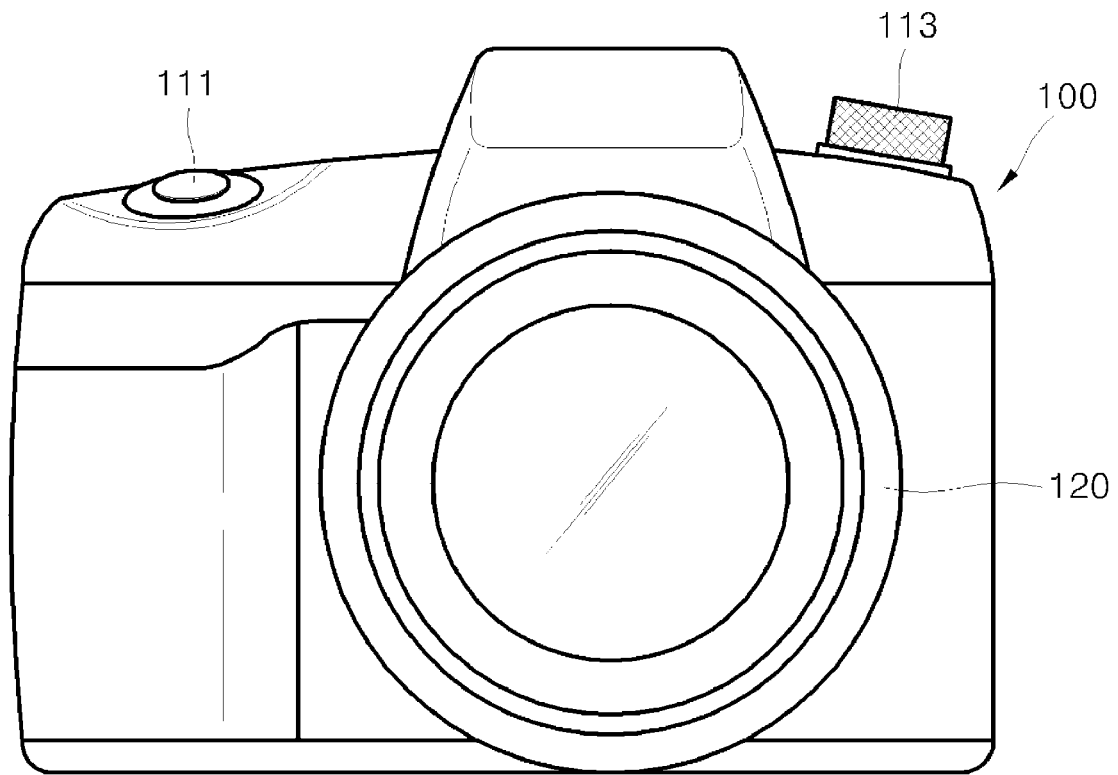
FIG. 1 is a front view of a digital single lens reflex (DSLR) camera according to an embodiment of the present invention.

FIG. 1 illustrates a front side of a digital single lens reflex (DSLR) camera 100 according to an embodiment of the present invention. Referring to FIG. 1, a shutter-release button 111, a mode dial 113, and a lens unit 120 are installed on a front side of the DSLR camera 100 of the present embodiment.

The shutter-release button 111 of the DSLR camera 100 opens and closes an image-obtaining element, e.g., a charge-coupled device (CCD) or a complementary metal oxide semiconductor (CMOS), to expose the image-obtaining element to light for a predetermined time. The shutter-release button 111 also operates along with an aperture (not shown) to appropriately expose an object so as to record an image of the object in the image-obtaining element.

The shutter-release button 111 generates first and second image photographing signals from an input of a photographer. If the first image photographing signal is input as a half-shutter signal, the DSLR camera 100 controls an amount of light on a focal point. If the focal point is completely adjusted and the amount of the light is completely controlled by the input of the first image photographing signal, the second image photographing signal is input as a whole-shutter signal to capture an image.

The mode dial 113 is pressed to select a photographing mode. The mode dial 113 of the DSLR camera 100 supports an auto (auto photographing) mode, a scene mode, an effect mode, an A/S/M mode, etc. The auto mode is used to minimize setups of a user and rapidly and conveniently photograph an image according to the intensions of the user. The scene mode is used to simply optimally set a camera according to photographing conditions or conditions of an object. The effect mode is used to give a special effect to image photographing, for example, effects such as continuous photographing, scene photographing, etc. The A/S/M mode is used to manually set various functions including the speeds of an aperture and a shutter to photograph an image. However, the present invention is not limited thereto.

The lens unit 120 receives light from an external light source to process the image.

Figure 2:
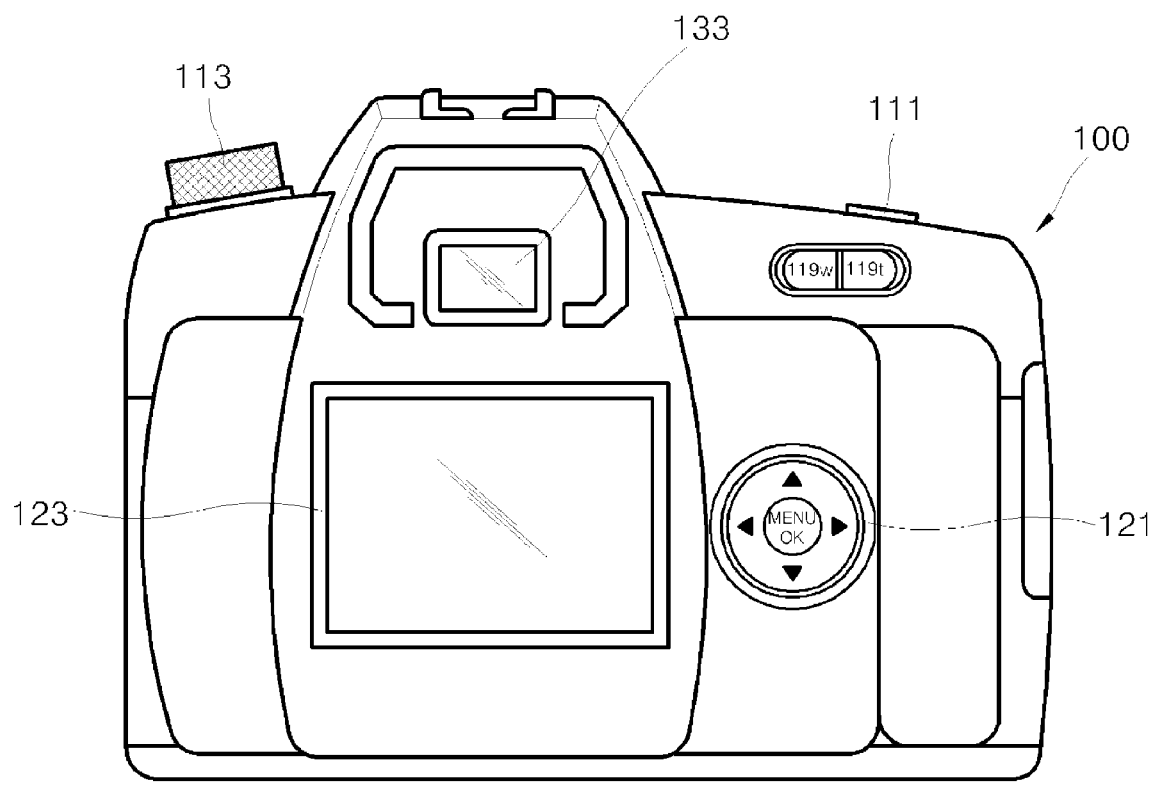
FIG. 2 is a rear view of the DSLR camera of FIG. 1.

FIG. 2 illustrates a side of the DSLR camera 100 of FIG. 1. Referring to FIG. 2, a viewfinder 133, a wide angle-zoom button 119w, a telephoto-zoom button 119t, a function button 121, and a display unit 123 are installed on the rear side of the DSLR camera 100.

The viewfinder 133 of the DSLR camera 100 is a display screen through which a composition of an object to be photographed is set.

The wide angle-zoom button 119w or the telephoto-zoom button 119t is pressed to widen or narrow a view angle, respectively, in particular, may be pressed to change the size of a selected exposed area. When the wide angle zoom-button 119w is pressed, the size of the selected exposed area is reduced. When the telephoto-zoom button 119t is pressed, the size of the selected exposed area is increased.

The function button 121 includes up, down, left, right, and MENU/OK buttons, i.e., a total of five buttons. The function button 121 is pressed to execute various menus related to operations of the DSLR camera 100. The up, down, left, right, and MENU/OK buttons may be used as shortcut keys, and the functions of the function button 121 may vary according to manufacturing companies.

Figure 3:
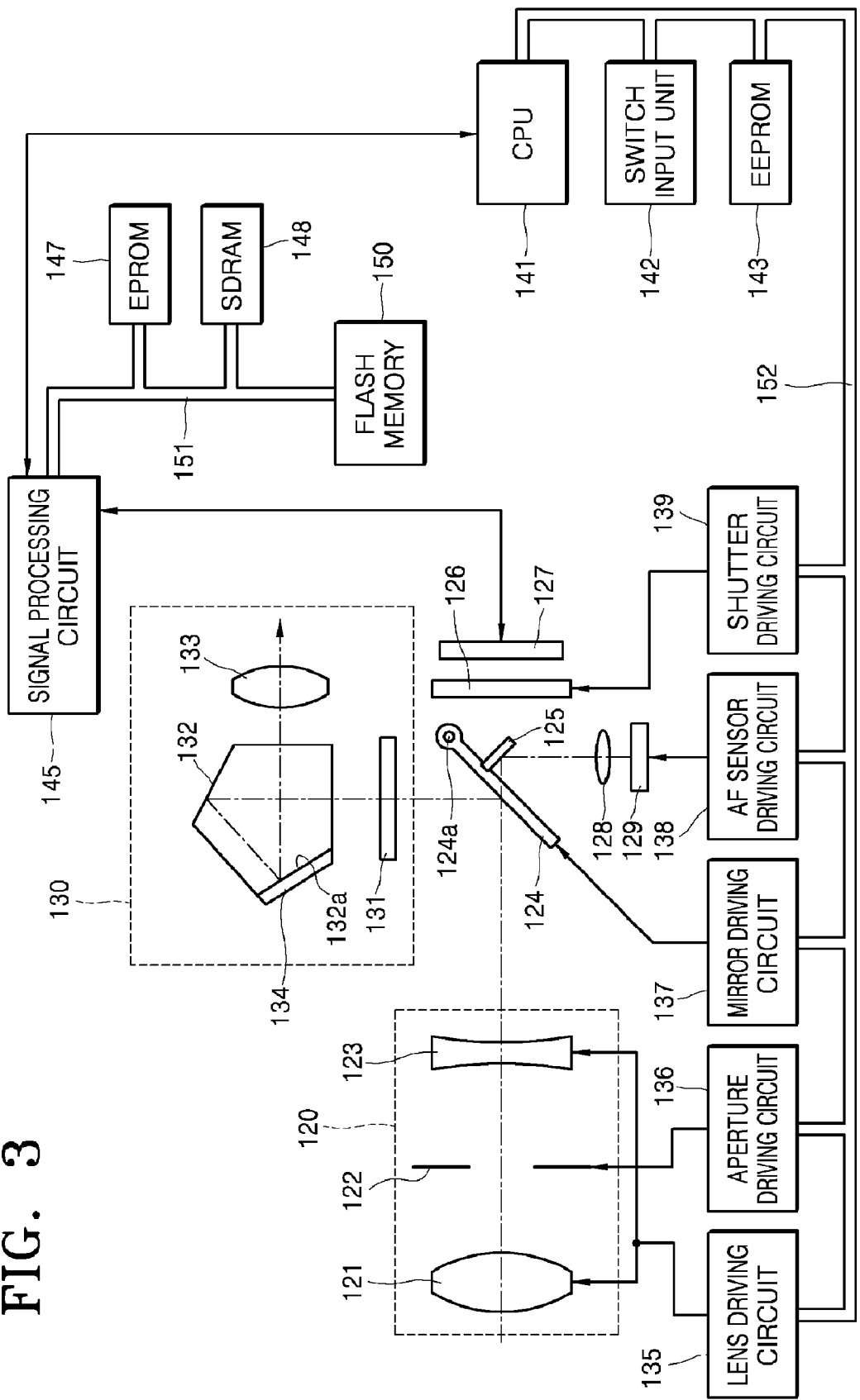
FIG. 3 is a block diagram of the DSLR camera of FIG. 1.

FIG. 3 is a block diagram of the DSLR camera 100 of FIG. 1. Referring to FIG. 3, the DSLR camera 100 includes a central processing unit (CPU) 141 and a plurality of elements, e.g., the lens unit 120, a shutter 126, an imaging device 127, and a finder optical system 130, etc. The CPU 141 is a controlling unit that controls an overall operation of the DSLR camera 100, and the plurality of elements operate according to a control signal output from the CPU 141.

The lens unit 120 includes first and second lenses 121 and 123 and an aperture 122 that is disposed between the first and second lenses 121 and 123. Thus, the first and second lenses 121 and 123 of the lens unit 120 are driven by a lens driving circuit 135, and the aperture 122 is driven by an aperture driving circuit 136.

A mirror 124 is formed in the rear of the second lens 123, on an optical axis of the first and second lenses 121 and 123. A central portion of the mirror 124 is formed as a half mirror. The mirror 124 may pivot on a shaft 124a, within a predetermined angle.

A sub mirror 125 is formed on a rear side of the mirror 124. A portion of light incident on the lens unit 120 penetrates the mirror 124 and then is reflected from the sub mirror 125. A separator optical system 128 is disposed on an axis of the light reflected from the sub mirror 125 so as to separate the image into two images. An auto focus (AF) sensor 129 is disposed in an imaging position of an image of an object, which is formed by the separator optical system 128. The AF sensor 129 is connected to an AF sensor driving circuit 138.

The sub mirror 125, the separator optical system 128, and the AF sensor 129 constitute an apparatus for detecting a focus using a well-known phase difference method. The AF sensor driving circuit 138 is controlled by the CPU 141 so as to drive the AF sensor 129. In other words, the CPU 141 calculates a defocus amount based on an image signal generated by the AF sensor 129, and controls the lens driving circuit 135 using the calculated defocus amount to drive the first and second lenses 121 and 123 of the lens unit 120 so as to adjust a focal point. Here, the lens driving circuit 135 includes a driving source such as an electronic motor, an ultrasonic motor, or the like, a driver circuit for controlling the driving source, an encoder apparatus for detecting a position of a lens, etc.

The finder optical system 130 is disposed on a path of the light reflected from the mirror 124 and includes a focal plate 131, a pentaprism 132, the viewfinder 133, and a display device 134. Light of the object, which is obtained from the first and second lenses 121 and 123 of the lens unit 120, is reflected from the mirror 124 and then imaged on the focal plate 131. A photographer may check an image of an object, which has been imaged on the focal plate 131, using the pentaprism 132 and the viewfinder 133. The finder optical system 130 will be described in detail with reference to FIG. 4.

The mirror 124 and the sub mirror 125 may pivot on the shaft 124a of the mirror 124 within a predetermined range due to a mirror driving circuit 137 so as to retreat from the optical axis of the first and second lenses 121 and 123 of the lens unit 120. Also, the shutter 126 and the imaging device 127 are disposed in the rear of the mirror 124, on the optical axis of the lens unit 120.

The shutter 126 is controlled by a shutter driving circuit 139 that drives to open the shutter 126 for a predetermined time so that the imaging device 127 images the object. In other words, the mirror 124 is controlled by the mirror driving circuit 137 to rotate to retreat from the optical axis of the lens unit 120. If the shutter 126 is opened under the control of the shutter driving circuit 139, the image of the object is formed on the imaging device 127.

The lens driving circuit 135, the aperture driving circuit 136, the mirror driving circuit 137, the AF sensor driving circuit 138, and the shutter driving circuit 139 are connected to the CPU 141, including a micro-processor, through a data bus 152.

A switch input unit 142 and an electrically erasable programmable read-only memory (EEPROM) 143 that is non-volatile memory are also connected to the CPU 141 through the data bus 152.

The switch input unit 142 includes first and second release switches and a plurality of switches including power switches, etc. The first release switch is switched on by the first image photographing signal, which is the half-shutter signal generated by the shutter-release button 111 of the DSLR camera 100 of FIG. 1. The second release switch is switched on by the second image photographing signal, which is the whole-shutter signal generated by the shutter-release button 111 of the DSLR camera 100 of FIG. 1. The plurality of switches operate when a power button (not shown) is pressed. A manipulation signal generated through a manipulation of a switch installed on a side of the switch input unit 142 is supplied to the CPU 141.

When the first release switch is switched on, the CPU 141 drives the AF sensor driving circuit 138 to calculate a distance between the two images formed on the AF sensor 129. Also, the CPU 141 drives the lens driving circuit 135 based on data regarding the distance to adjust focal points of the first and second lenses 121 and 123 of the lens unit 120.

When the second release switch is switched on, the CPU 141 drives the mirror driving circuit 137 to retreat the mirror 124 from the optical axis of the lens unit 120. The CPU 141 also calculates an appropriate cross-section contraction value and a shutter exposure time based on luminance information of the object, which is based on an output of the AF sensor 129. In addition, the CPU 141 drives the aperture driving circuit 136 using the appropriate cross-section contraction value to drive the aperture 122, and drives the shutter driving circuit 137 using the shutter exposure time to drive the shutter 126.

When the image of the object is formed on an imaging plane of the imaging device 127 due to the above-described operations, the image of the object is converted into an analog image signal. Then, the analog image signal is converted into a digital image signal by a signal processing circuit 145.

The signal processing circuit 145 is connected to an erasable programmable read-only memory (EPROM) 147, a synchronous dynamic random access memory (SDRAM) 148, and a flash memory 150 through a data bus 151.

The EPROM 147 stores programs that are executed by a processor of the signal processing circuit 145. The SDRAM 148 temporarily stores image data generated before image processing or image data generated during image processing. The flash memory 150 is a non-volatile memory that stores image data that is finally determined. The SDRAM 148 is a volatile memory and operates at a high speed. However, if the supply of power to the SDRAM 148 is stopped, contents stored in the SDRAM 148 are lost. The flash memory 150 is non-volatile memory and operates at a low speed. However, even if the supply of power to the memory 150 is stopped, contents stored in the flash memory 150 are preserved.

Figure 4:
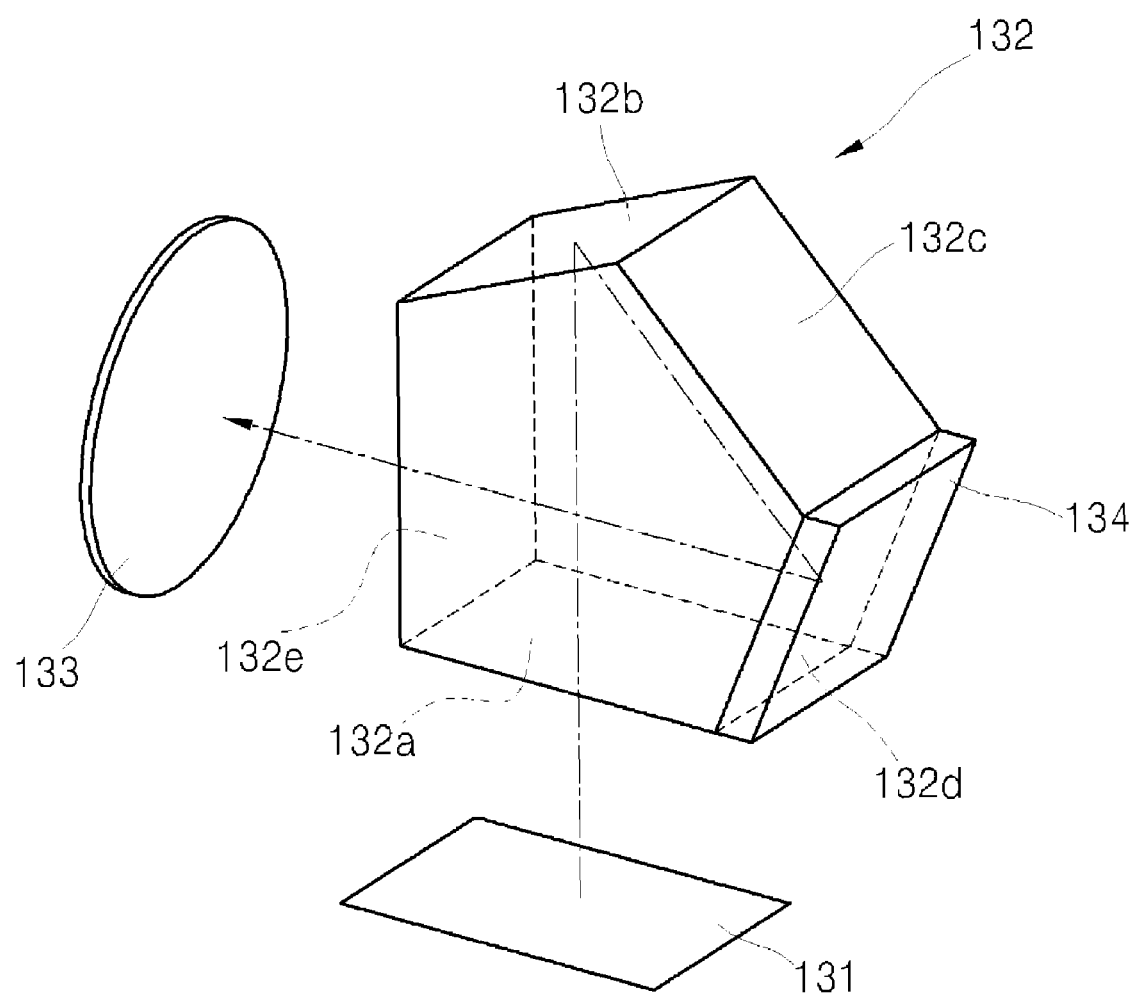
FIG. 4 is a perspective view of a finder optical system of the DSLR camera of FIG. 3.

FIG. 4 is a perspective view of the finder optical system 130 of the DSLR camera 100 of FIG. 3. Referring to FIG. 4, the finder optical system 130 of the DSLR camera 100 includes the focal plate 131, the pentaprism 132, the viewfinder 133, and the display device 134.

The image of the object penetrates the first and second lenses 121 and 123 of the lens unit 120, is reflected from the mirror 124, and is formed on the focal plate 131.

The pentaprism 132 is a five-sided reflecting prism. The pentaprism 132 may deviate a straight image by 90 degrees and thus may be used in a finder of a single lens reflex camera.

The image of the object, which has been formed on the focal plate 131 and then penetrated the pentaprism 132, is displayed on the viewfinder 133 to the photographer.

The display device 134 displays predetermined photographing information including focus information, camera information, etc., and is combined to a side of the pentaprism 132.

In a viewfinder of a conventional single lens reflex camera, a series of pieces of camera information, including a currently set photographing mode, the number of images to be photographed, ISO sensitivity, a shutter speed, an aperture value, etc., is not able to be checked. Thus, if a user desires to check the camera information while observing an image of an object, on the viewfinder, the user must distance his or her eyes from the viewfinder to be able to properly check the camera information displayed on a display window and also then be able to check the image of the object, on the viewfinder.

In order to solve this problem, various embodiments of the present invention is characterized in that the display device 134 is disposed on the side of the pentaprism 132 to display predetermined photographing information, including focus information, camera information, etc., on the display screen of the viewfinder 133.

In detail, the image of the object, which is formed on the focal plate 131, penetrates a first side 132a of the pentaprism 132, is reflected from second and fourth sides 132b and 132d of the pentaprism 132, and is emitted through a fifth side 132e of the pentaprism 132. Here, the display device 134 that displays the predetermined photographing information may be attached to the second and/or fourth sides 132b and 132d of the pentaprism 132, which reflect the image of the object. In other words, in FIG. 4, the display device 134 is attached to the fourth side 132d of the pentaprism 132. However, the present invention is not limited thereto. The display device 134 may be attached to the second side 132b of the pentaprism 132, which reflects the image of the object. Also, in FIG. 4, the display device 134 is attached to the side 132d of the pentaprism 132. However, the present invention is not limited thereto, and thus, the display device 134 may be installed at a predetermined distance apart from the side 132d of the pentaprism 132.

Here, the display device 134 may be an organic light-emitting display device, which is a self-emitting type display that electrically excites a fluorescent organic compound to emit light. The organic light-emitting display device operates at a low voltage, is easily made thin, and has attracted attention as a next generation display capable of solving problems of a liquid crystal display (LCD) such as a wide view angle, a fast response speed, etc.

Such an organic light-emitting display device is a self-emitting type device and thus maintains the same color representation as the LCD regardless of surrounding brightness. Also, the organic light-emitting display device has a response speed ten or more times faster than an LCD requiring a backlight. In addition, the organic light-emitting display device does not require a backlight and thus is made thin. Thus, the organic light-emitting display device may occupy less space in a camera than an LCD. Moreover, since the organic light-emitting display device has a wide view angle, high luminance, and color purity, the organic light-emitting display device may obtain high readability, as will be described in detail later.

The display device 134 may substantially have the same size as a side of the pentaprism 132 to which the display device 134 is attached, i.e., the second and/or fourth sides 132b and 132d. Therefore, if the display device 134 is attached to the pentaprism 132, four edges of the display device 134 are correspondingly fixed to four edges of a side of the pentaprism 132. Thus, it is easy to assemble the display device 134 with the pentaprism 132, and assembling errors may be reduced. In other words, a conventional superimposing apparatus is formed separately from a pentaprism and thus is not easy to be assembled with the pentaprism. Thus, assembling errors may occur between the pentaprism and the conventional superimposing apparatus. In this case, a range finder point measuring error and an imposing distorting phenomenon occur, resulting in serious problems, i.e., a focal point of an image to be photographed is defocused. In order to solve these problems, in various embodiments of the present invention, the display device 134, which substantially has the same size as a side of the pentaprism 132, is attached to the side of the pentaprism 132.

The display device 134 is formed in a size greater than the image of the object, which is formed on the focal plate 131, so as to display focus information in an area of the display device 134, on which the image of the object is formed, and display camera information in another area of the display device 134, on which an image of the object is not formed.

Figure 5A:
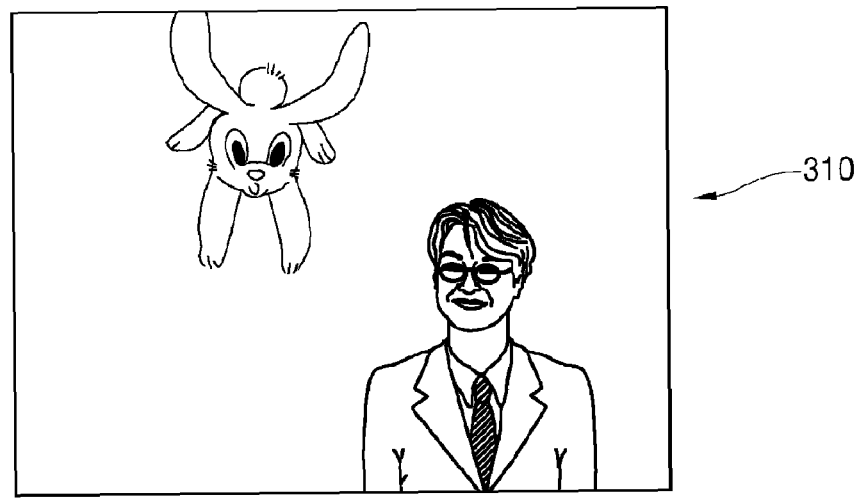
FIG. 5A is a pictorial view illustrating an image of an object, which is formed on a focal plate, according to an embodiment of the present invention.
Figure 5B:
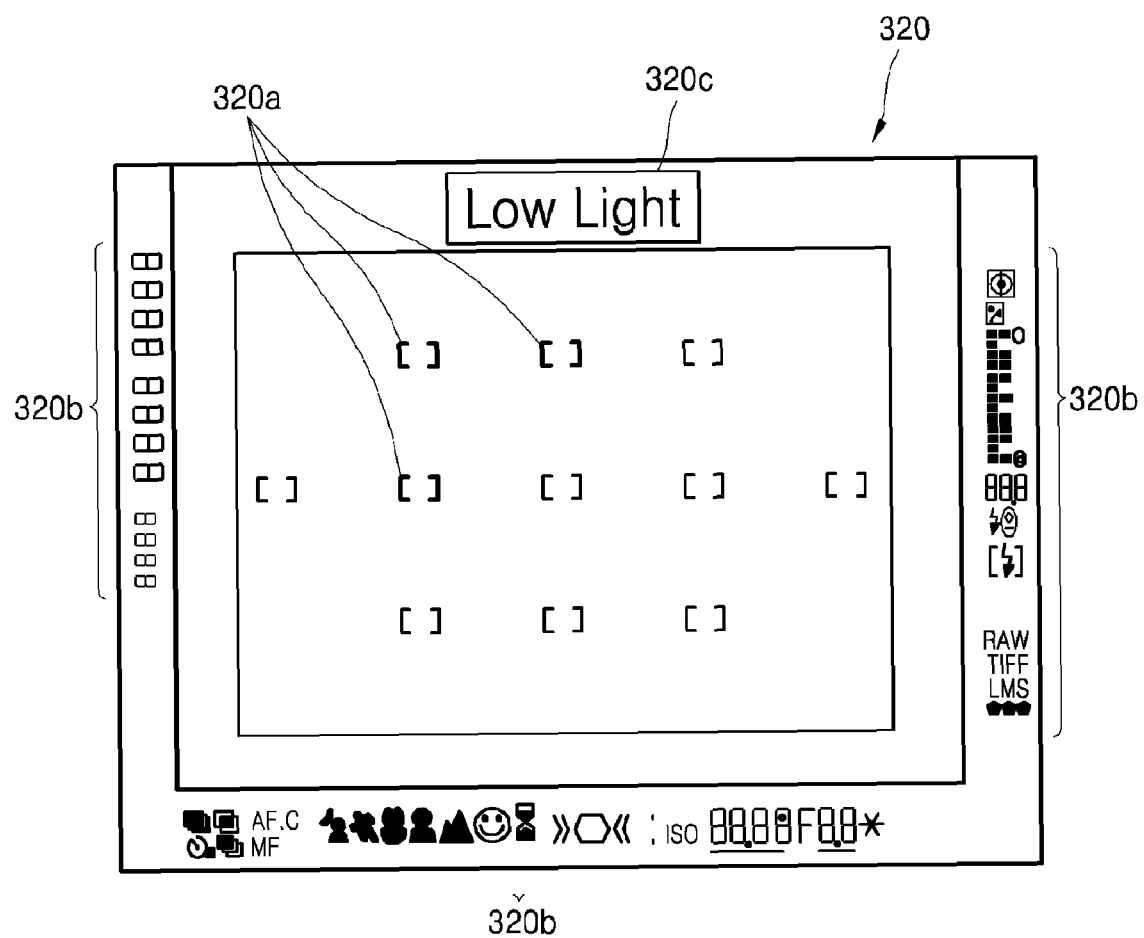
FIG. 5B is a pictorial view illustrating a display by a screen of a display device according to an embodiment of the present invention.
Figure 5C:
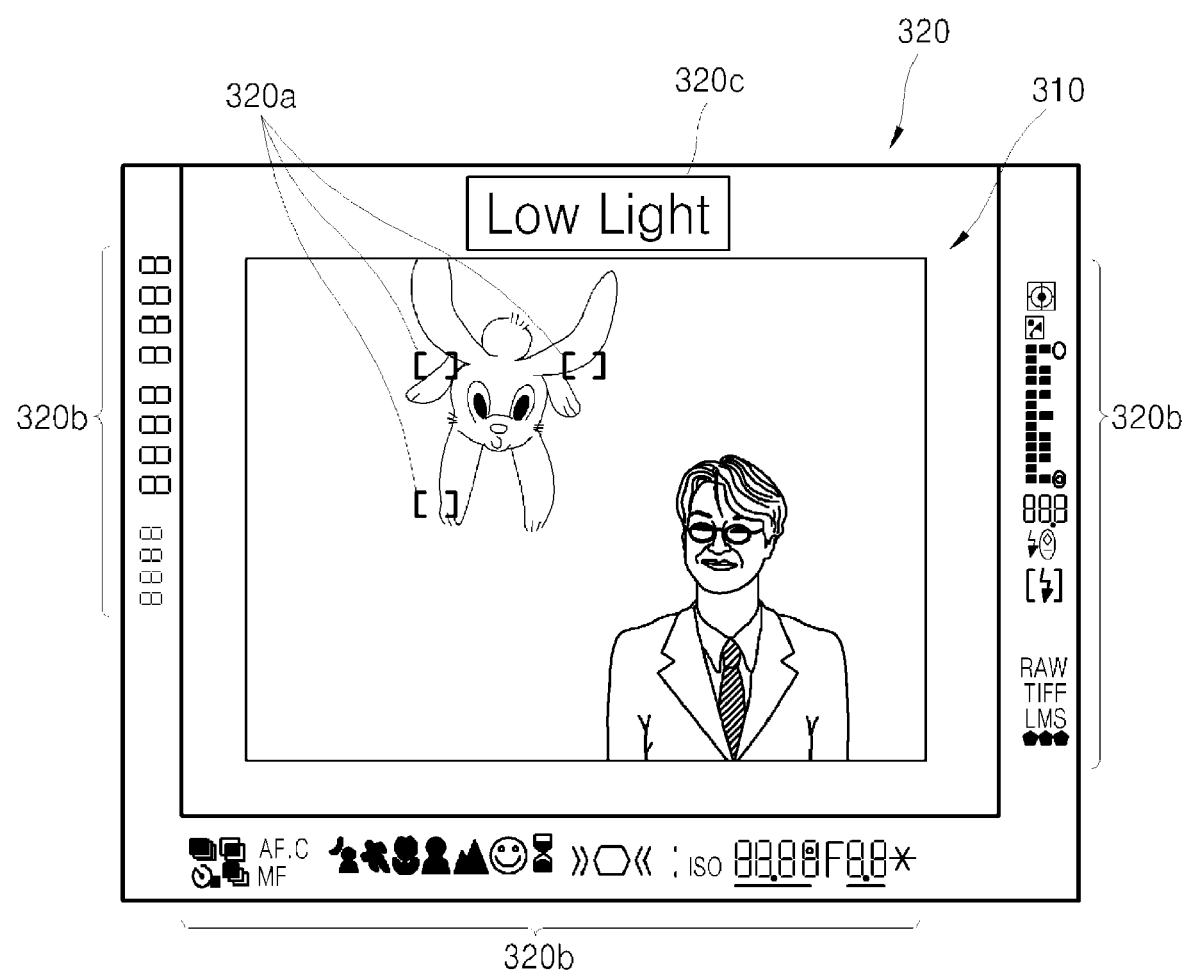
FIG. 5C is a pictorial view illustrating a viewfinder displaying an image of an object, which is formed on a focal plate, and the screen of the display device, according to an embodiment of the present invention.

FIG. 5A illustrates an image 310 of an object, which is formed on the focal plate 131, according to an embodiment of the present invention. FIG. 5B illustrates a display by a screen 320 of the display device 134, according to an embodiment of the present invention. FIG. 5C illustrates the viewfinder 133 displaying the image 310 of the object formed on the focal plate 131 and the display by the screen 320 of the display device 134, according to an embodiment of the present invention.

As shown in FIGS. 5A through 5C, the screen 320 of the display device 134 is slightly larger than the image 310 of the object formed on the focal plate 131, and thus, a central area of the display device 134 optically overlaps with the image 310 of the object formed on the focal plate 131; however an edge portion of the display device 134 does not optically overlap with the image 310 of the object formed on the focal plate 131.

Thus, focus information is displayed on the central area of the display device 134 that optically overlaps with the image 310 of the object formed on the focal plate 131.

The conventional superimposing apparatus is developed in the conventional single lens reflex camera to display the focal point on the image of the object that is observed on viewfinder. In other words, the conventional superimposing apparatus including the plurality of light-emitting elements is installed on an optical path. Also, the light-emitting element corresponding to the focal area emits the light to form the range finder point mark, etc., in order to display the focus information to the user who observes the image of the object, on the viewfinder. However, the conventional superimposing apparatus is formed separately from the pentaprism and thus is not easy to be assembled. Also, the focus information is displayed only in an area on which the light-emitting element is installed.

In order to solve these problems, various embodiments of the present invention are characterized in that the display device 134 is attached to a side of the pentaprism 132, so that the display device 134 displays focus information.

In other words, in these embodiments, the display device 134 is attached correspondingly to the side of the pentaprism 132. Also, the focus information is displayed in the central area of the display device 134, which optically overlaps with the image 310 of the object formed on the focal plate 131. As shown in FIG. 5B, a plurality of focal points 320a are formed on the screen 320 of the display device 134. In other words, if focus information of an image of an object is measured, the focus information is displayed in its corresponding focal point 320a among the plurality of focal points 320a.

According to this design, an additional superimposing apparatus is not required. Thus, an assembling process may be simplified, the number of parts may be reduced, and an error rate may be reduced. Also, the conventional superimposing apparatus displays the focus information only in the area in which the light-emitting element is installed. However, in these embodiments, pixels of the display device 134 may display focus information so as to display the focus information in any substantial focal area.

The central area of the display device 134, which optically overlaps with the image 310 of the object, may be displayed in black. Thus, reflectivity of the pentaprism 132 may be improved to improve luminance and color purity. As a result, high readability may be obtained. Also, an organic light-emitting display device may realize a more perfect black color at low power than other flat panel display devices.

Camera information is displayed on the edge portion of the display device 134, which does not optically overlap with the image of the object formed on the focal plate 131.

The series of camera information, including the currently set photographing mode, the number of images to be photographed, the ISO sensitivity, the shutter speed, the aperture value, etc., is not able to be checked in the viewfinder of the conventional single lens reflex camera. Thus, if the user desires to check the camera information, observing the image of the object, the user must separate the eyes from the viewfinder to check the camera information displayed on the display screen and then check the image of the object, on the viewfinder.

In order to solve this problem, various embodiments of the present invention are characterized in that the display device 134 is attached to the side of the pentaprism 132 to display the camera information on the display device 134.

In other words, in these embodiments, the display device 134 is attached correspondingly to the side of the pentaprism 132 so as to display the camera information on the edge portion of the display device 134, which does not optically overlap with the image of the object formed on the focal plate 131. Here, the camera information may include at least one or more currently set photographing modes, the number of images to be photographed, ISO sensitivity, a shutter speed, and an aperture value. As shown in FIG. 5B, camera information display areas 320*b* are formed on the screen 320 of the display device 134. In other words, the photographer may display various types of information that the photographer desires to check, while observing an image of an object, on a viewfinder. Here, the various types of information include a currently set photographing mode, the number of images to be photographed, ISO sensitivity, a shutter speed, an aperture value, etc. Also, various types of signals/warnings/other messages, etc., may be displayed on a character display area 320*c*, wherein the various types of signals/warnings/other messages are expressed with various types of characters.

As described above, a user may check various types of camera information, while observing an image of an object, on a viewfinder.

Figure 6:
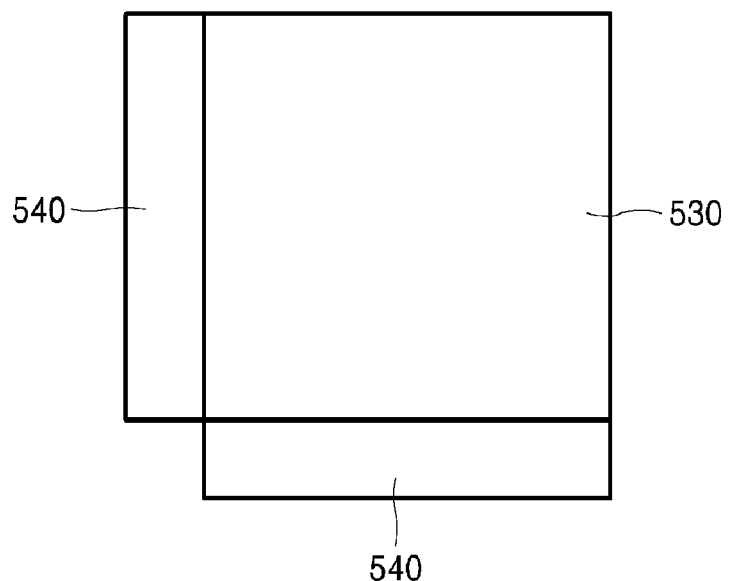
FIG. 6 is a plan view of an organic light-emitting display device according to an embodiment of the present invention.

FIG. 6 is a plan view of an organic light-emitting display device according to an embodiment of the present invention. Referring to FIG. 6, the organic light-emitting display device of the present embodiment includes a pixel area 530 and a circuit area 540 that is formed at an edge of the pixel area 530. The pixel area 530 includes a plurality of pixels, each of which includes a light-emitting unit that emits light to realize a predetermined image.

According to an aspect of the present invention, a light-emitting unit may include a plurality of sub-pixels each having an organic electroluminescent device. A full color organic light-emitting display device is arrayed with red (R), green (G), and blue (B) sub-pixels in various patterns including a line pattern, a mosaic pattern, a lattice pattern, etc., to constitute pixels. Also, the full color organic light-emitting display device may be a mono color flat panel display device, not a full color flat panel display device.

The circuit area 540 controls an image signal, etc., input to the pixel area 530.

In the organic light-emitting display device, at least one or more thin film transistors (TFTs) may be installed in each of the pixel area 530 and the circuit area 540.

Examples of a TFT installed in the pixel area 530 include a switching TFT and a driving TFT, which is a pixel TFT, etc. The switching TFT transmits a data signal to a light-emitting device according to a signal of a gate line, so as to control its operation. The driving TFT drives an organic luminescent device according to the data signal in order to allow a predetermined current to flow in the organic luminescent device. Also, a circuit TFT may be installed in the circuit area 540 to realize a predetermined circuit.

The number and arrangement of the TFTs may depend on characteristics and a driving method of a display, and the TFTs may be arranged using various methods.

Figure 7:
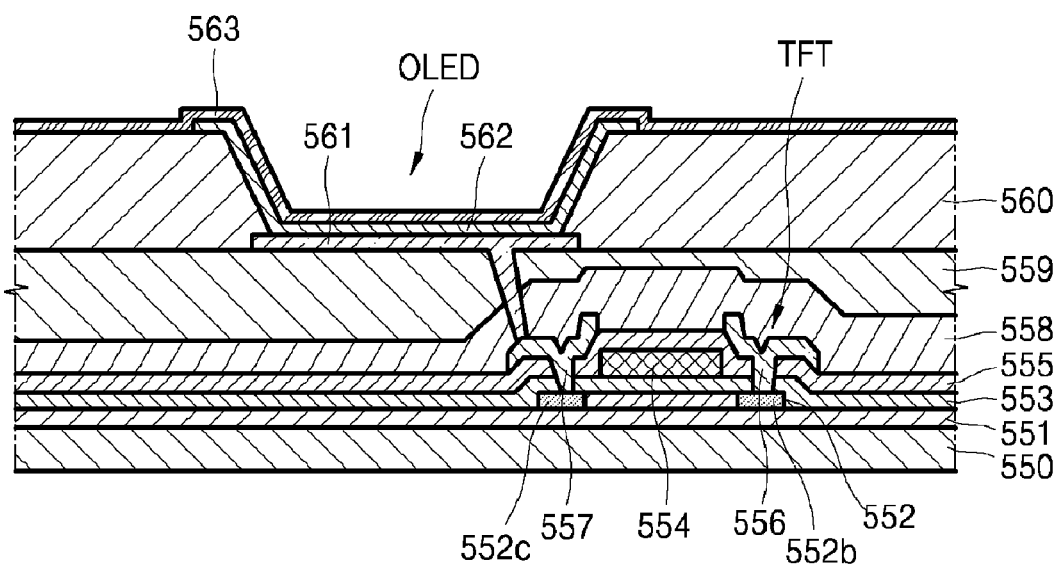
FIG. 7 is a cross-sectional view of a sub-pixel of the organic light-emitting display device of FIG. 6.

FIG. 7 is a cross-sectional view of a sub-pixel of the organic light-emitting display device of FIG. 6. As shown in FIG. 7, a buffer layer 551 is formed on a substrate 550 that is formed of a glass or plastic material. A TFT and an organic light-emitting diode (OLED) are formed on the buffer layer 551.

An active layer 552 is formed in a predetermined pattern, on the buffer layer 551 formed on the substrate 550. A gate insulating layer 553 is formed on the active layer 552, and a gate electrode 554 is formed on a predetermined area of the gate insulating layer 553. The gate electrode 554 is connected to a gate line (not shown) through which a signal for turning on and/or off the TFT is applied. An interlayer insulating layer 555 is formed on the gate electrode 554, and source and drain electrodes 556 and 557 are formed to respectively contact source and drain areas 552*b* and 552*c* of the active layer 552 through contact holes.

A passivation layer 558 is formed of $SiO_2$, SiNx, or the like, on the source and drain electrodes 556 and 557, and a planarizing layer 559 is formed of an organic material such as acryl, polyimide, benzocyclobutene (BCB), or the like, on the passivation layer 558.

A pixel electrode 561 is formed on the planarizing layer 559, and a pixel defining layer 560 is formed of an organic material to cover the pixel electrode 561. Here, the pixel electrode 561 functions as an anode electrode of the OLED. A predetermined opening is formed in the pixel defining layer 560, and then an organic layer 562 is formed on the pixel defining layer 560 and the pixel electrode 561 that is exposed through the predetermined opening. The organic layer 562 includes an emission layer (EML). Also, the present invention is not limited to the organic light emitting display device of the present embodiment, and thus, various types of organic light emitting display devices may be used.

The OLED emits R, G, and B beams according to the flow of current, so as to display predetermined image information, and includes the pixel electrode 561, a counter electrode 563, and the organic layer 562. The pixel electrode 561 is connected to the drain electrode 557 to be supplied with plus power from the drain electrode 557. The counter electrode 563 covers all pixels to supply minus power thereto. The organic layer 562 is disposed between the pixel electrode 561 and the counter electrode 563 to emit light.

The pixel electrode 561 and the counter electrode 563 are insulated from each other by the organic layer 562 and an auxiliary layer 564 (not shown), and apply voltages, having different polarities, to the organic layer 562 so that the organic layer 562 emits the light.

The organic layer 562 may be a low or high molecular organic layer. If the organic layer 562 is the low molecular organic layer, a hole injection layer (HIL), hole transport layer (HTL), an EML, an electron transport layer (ETL), an electron injection layer (EIL), etc., may be stacked in a single or complex structure to form the low molecular organic layer. The low molecular organic layer may be formed of an organic material such as copper phthalocyanine (CuPc), N,N'-Di (naphthalene-1-yl)-N,N'-diphenyl-benzidine (NPB), tris-8-hydroxyquinoline aluminum (Alq3), or the like. The low molecular organic layer may be formed using a vacuum deposition method.

If the organic layer 562 is the high molecular organic layer, the high molecular organic layer may include an HTL and an EML. Here, the HTL may be formed of PEDOT, and the EML may be formed of a high molecular organic material such as Poly-Phenylenevinylene (PPV), Polyfluorene, or the like. The high molecular organic layer may be formed using a screen printing method, an ink-jet printing method, or the like.

The organic layer 562 is not necessarily limited thereto, and thus, various types of organic layers may be applied.

The pixel electrode 561 functions as the anode electrode, and the counter electrode 563 functions as a cathode electrode. Also, a polarity of the pixel electrode 561 may be different from a polarity of the counter electrode 563.

The pixel electrode 561 may be a transparent electrode or a reflective electrode. If the pixel electrode 561 is the transparent electrode, the pixel electrode 561 may be formed of ITO, IZO, ZnO, or $In_2O_3$. If the pixel electrode 561 is the reflective electrode, a reflective layer may be formed of Ag, Mg, Al, Pt, Pd, Au, Ni, Nd, Ir, Cr, or a compound of Ag, Mg, Al, Pt, Pd, Au, Ni, Nd, Ir, and Cr and then doped with ITO, IZO, ZnO, or $In_2O_3$ to be formed.

The counter electrode 563 may be a transparent electrode or a reflective electrode. If the counter electrode 563 is the transparent electrode, the counter electrode 563 may be used as a cathode electrode. Thus, a metal having a low work function, i.e., Li, Ca, LiF/Ca, LiF/Al, Al, Ag, Mg, or a compound of Li, Ca, LiF/Ca, LiF/Al, Al, Ag, and Mg, may be deposited to face the organic layer 562. Next, an auxiliary electrode layer or a bus electrode line may be formed of a material for forming a transparent electrode, such as ITO, IZO, ZnO, or $In_2O_3$, on the metal in order to form the counter electrode 563. If the counter electrode 563 is the reflective electrode, Li, Ca, LiF/Ca, LiF/Al, Al, Ag, Mg, or a compound of Li, Ca, LiF/Ca, LiF/Al, Al, Ag, and Mg may be deposited on the whole surface of the pixel defining layer 560 and the organic layer 562.

As described above, in a DSLR camera according to the present invention, predetermined photographing information, including focus information, camera information, etc., can be displayed on a display screen of a viewfinder.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent exemplary functional relationships and/ or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The word mechanism is intended to be used generally and is not limited solely to mechanical embodiments. Numerous modifications and adaptations will be readily apparent to those skilled in this art without departing from the spirit and scope of the present invention.

What is claimed is:

1. A digital single lens reflex (DSLR) camera comprising:
a viewfinder for observing an image of an object;
a pentaprism for outputting the image of the object to the viewfinder; and
a flat display device disposed on a side of the pentaprism to display photographing information,
wherein
the flat display device is directly attached to and substantially coplanar with the side of the pentaprism,
the side of the pentaprism to which the display device is attached is one of the sides of the pentaprism that reflects the image of the object, and
the flat display device has substantially a same size as the side of the pentaprism to which the flat display device is attached and entirely covers the side of the pentaprism.

2. The DSLR camera of claim 1, wherein the display device is an organic light-emitting display device.

3. The DSLR camera of claim 2, wherein the organic light-emitting display device comprises:
at least one thin film transistor (TFT) comprising an active layer formed on a substrate, a gate electrode insulated from the active layer, and source and drain electrodes contacting the active layer, the substrate being substantially coplanar with the side of the pentaprism; and
an organic light-emitting diode electrically connected to the TFT.

4. The DSLR camera of claim 1, wherein the image of the object is displayed on the viewfinder, together with the photographing information displayed on the display device.

5. The DSLR camera of claim 1, wherein the photographing information comprises focus information for the image of the object.

6. The DSLR camera of claim 5, wherein the focus information overlaps with the image of the object, in an area of the display device that overlaps with a focal area of the image of the object.

7. The DSLR camera of claim 1, wherein the photographing information comprises camera information as currently set in the DSLR camera.

8. The DSLR camera of claim 7, wherein the camera information comprises at least one of a photographing mode, a number of images to be photographed, an International Standardization Organization (ISO) sensitivity, a shutter speed, or an aperture value.

9. A digital single lens reflex (DSLR) camera comprising:
a lens unit;
a mirror that changes an advancing direction of light of an object, which has passed through the lens unit;
a focal plate on which an image of the object is formed;
a finder optical system for observing the image of the object formed on the focal plate, wherein the image of the object formed on the focal plate and photographing information of the DSLR camera are simultaneously displayed using the finder optical system; and
a display device to display the photographing information via the finder optical system, wherein the display device is formed having a size that is larger than the image of the object formed on the focal plate;
wherein the finder optical system comprises:
a viewfinder for observing the image of the object; and
a pentaprism outputting the image of the object to the viewfinder,
wherein
the display device is directly disposed on a side of the pentaprism that reflects the image of the object; and
the display device entirely covers the side of the pentaprism to which the flat display device is attached.

10. The DSLR camera of claim 9, wherein the display device is an organic light-emitting display device.

11. The DSLR camera of claim 10, wherein the light-emitting display device comprises:
at least one thin film transistor (TFT) comprising a semiconductor active layer formed on a substrate, a gate electrode insulated from the semiconductor active layer, and source and drain electrodes contacting the semiconductor active layer;
a plurality of pixel electrodes formed on the TFT;
pixel defining layers formed among the pixel electrodes;
a plurality of organic layers respectively formed on the pixel defining layers; and
a counter electrode formed on the organic layers.

12. The DSLR camera of claim 9, wherein an area of the display device, which optically overlaps with the image of the object, is displayed having a black background that improves luminance and color purity enhancing readability.

13. The DSLR camera of claim 9, wherein measured focus information for the image of the object is displayed on an area of the display device that optically overlaps with the image of the object.

14. The DSLR camera of claim 9, wherein camera information is displayed in a first area of the display device that is outside a second area of the display device that optically overlaps with the image of the object.

15. The DSLR camera of claim 14, wherein the camera information comprises at least one of a photographing mode, a number of images to be photographed, an International Standardization Organization (ISO) sensitivity, a shutter speed, or an aperture value.

16. The DSLR camera of claim 9, wherein the pentaprism and the display device are formed into a single body.

17. A digital single lens reflex (DSLR) camera comprising:
a viewfinder for observing an image of an object;
a pentaprism for outputting the image of the object to the viewfinder; and
a flat display device disposed on a side of the pentaprism to display photographing information on the viewfinder,
wherein the display device is directly attached to and substantially coplanar with the side of the pentaprism and the display device substantially has the same length and width as the length and width of the side of the pentaprism to which the display device is attached and entirely covers the side of the pentaprism.

* * * * *